United States Patent
Sakamoto et al.

(10) Patent No.: US 8,488,216 B2
(45) Date of Patent: Jul. 16, 2013

(54) LED LIGHT SOURCE AND IMAGE READING APPARATUS

(75) Inventors: Fumihide Sakamoto, Kai (JP); Yuichi Kagami, Kai (JP); Satoshi Tanaka, Minamialps (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 619 days.

(21) Appl. No.: 12/656,208

(22) Filed: Jan. 21, 2010

(65) Prior Publication Data

US 2010/0214803 A1 Aug. 26, 2010

(30) Foreign Application Priority Data

Feb. 20, 2009 (JP) ................................ 2009-037890
Feb. 20, 2009 (JP) ................................ 2009-037891

(51) Int. Cl.
*H04N 1/04* (2006.01)
(52) U.S. Cl.
USPC ............ 358/475; 358/474; 358/509; 362/617
(58) Field of Classification Search
USPC .. 358/475, 509, 482, 483, 474, 496; 362/612, 362/617
See application file for complete search history.

(56) References Cited

U.S. PATENT DOCUMENTS

| | | | |
|---|---|---|---|
| 6,118,503 A * | 9/2000 | Oki et al. | 349/65 |
| 6,344,886 B2 * | 2/2002 | Oki et al. | 349/65 |
| 6,357,903 B1 * | 3/2002 | Furusawa et al. | 362/555 |
| 6,447,136 B1 * | 9/2002 | Liu et al. | 362/625 |
| 7,073,933 B2 * | 7/2006 | Gotoh et al. | 362/624 |
| 7,177,082 B2 * | 2/2007 | Wakisaka et al. | 359/619 |
| 7,855,815 B2 * | 12/2010 | Hayashide et al. | 358/484 |
| 7,884,978 B2 * | 2/2011 | Ikeno et al. | 358/509 |
| 7,911,661 B2 * | 3/2011 | Morisaki | 358/475 |
| 7,942,561 B2 * | 5/2011 | Ishimaru et al. | 362/551 |
| 7,969,622 B2 * | 6/2011 | Saika | 358/475 |
| 7,982,924 B2 * | 7/2011 | Endo et al. | 358/474 |
| 7,995,252 B2 * | 8/2011 | Okamoto et al. | 358/487 |
| 8,004,724 B2 * | 8/2011 | Sakamoto | 358/412 |
| 8,059,315 B2 * | 11/2011 | Endo et al. | 358/474 |

FOREIGN PATENT DOCUMENTS

| | | |
|---|---|---|
| JP | H11-055476 A | 2/1999 |
| JP | 2000-048616 | 2/2000 |
| JP | 2002-101263 | 4/2002 |

* cited by examiner

*Primary Examiner* — Negussie Worku
(74) *Attorney, Agent, or Firm* — Manabu Kanesaka

(57) ABSTRACT

An LED light source device installed in an image reading apparatus, includes an LED that is a light-emitting source; and a light guide for reflecting light of the LED by an inner surface thereof to diffuse along a main scanning line direction and irradiating the light reflected by the light guide to a surface of a sheet. The light guide has a plurality of reflecting surface bodies spaced at predetermined pitches in the main scanning line direction inside an inner surface reflection optical path to reflect the light from the LED toward an outside along the main scanning line direction. The plurality of reflecting surface bodies includes a first reflecting surface body and a second reflecting surface body, and a length in a perpendicular direction to the main scanning line direction of the second reflecting surface body is different from that of the first reflecting surface body.

16 Claims, 16 Drawing Sheets

FIG.1
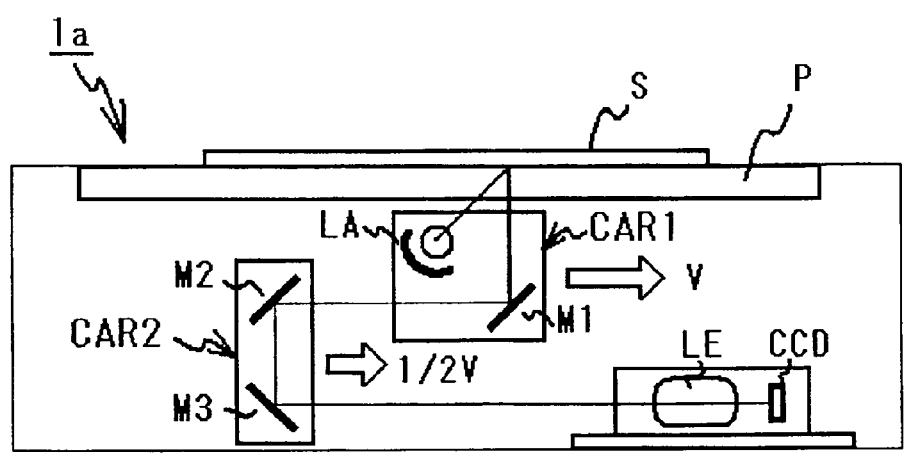
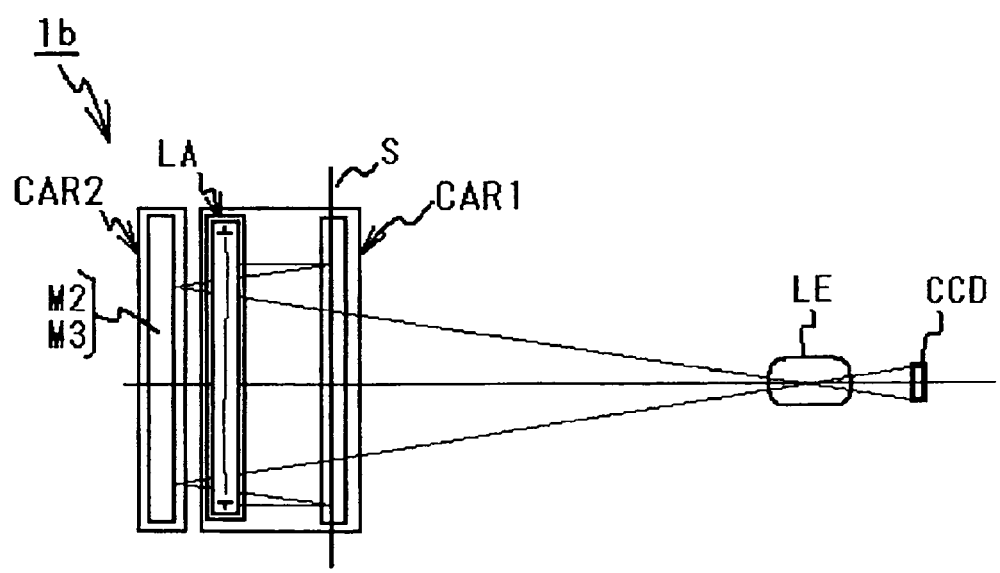

FIG.3
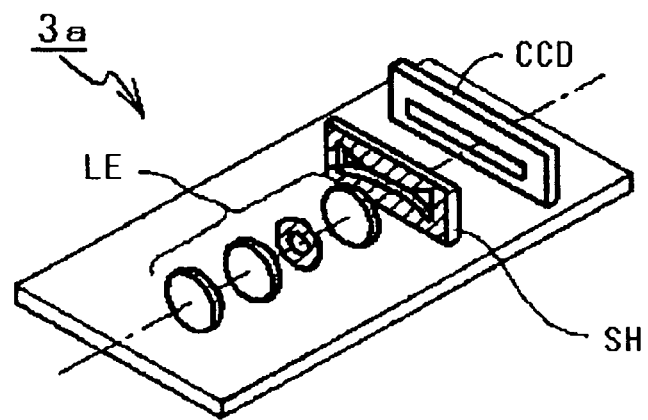
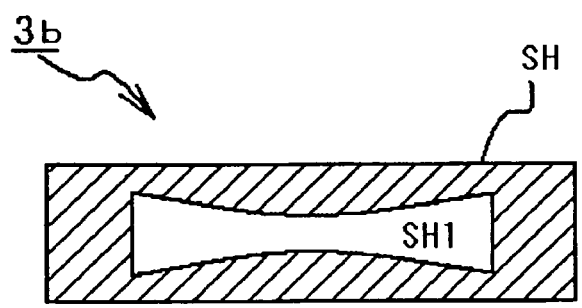

FIG.7
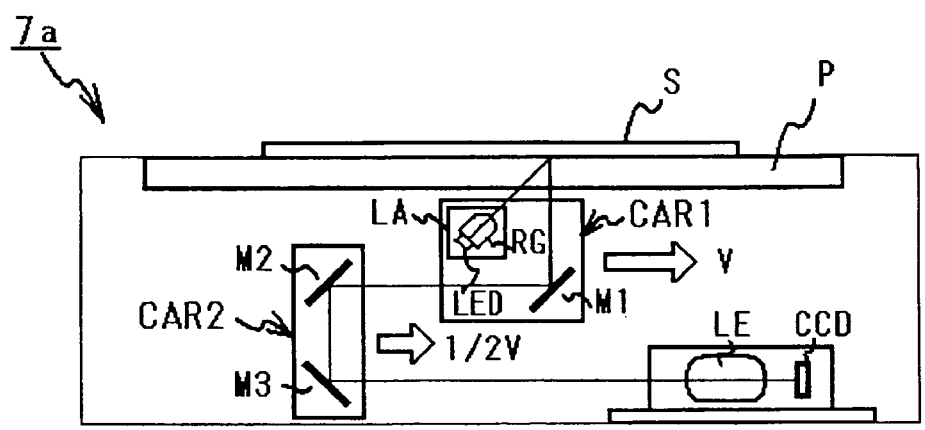
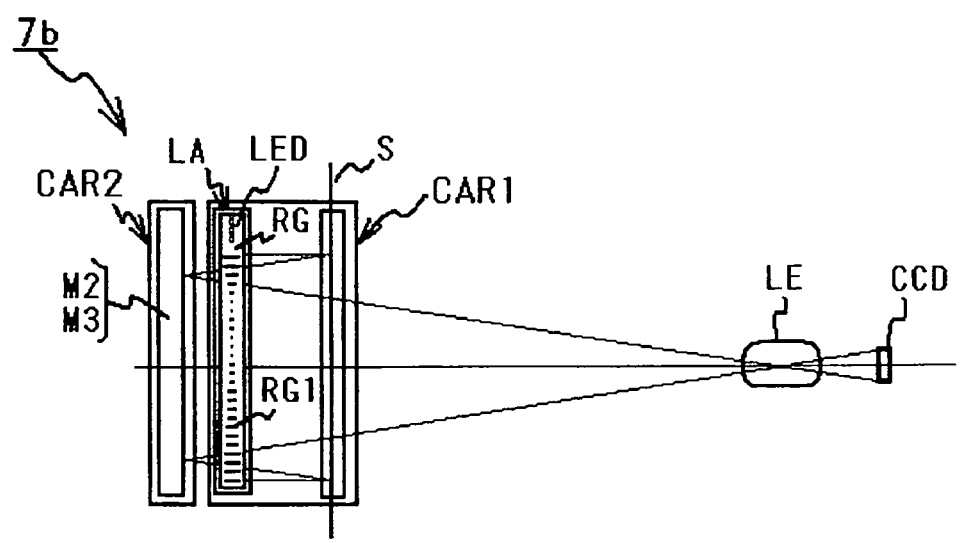

FIG.8
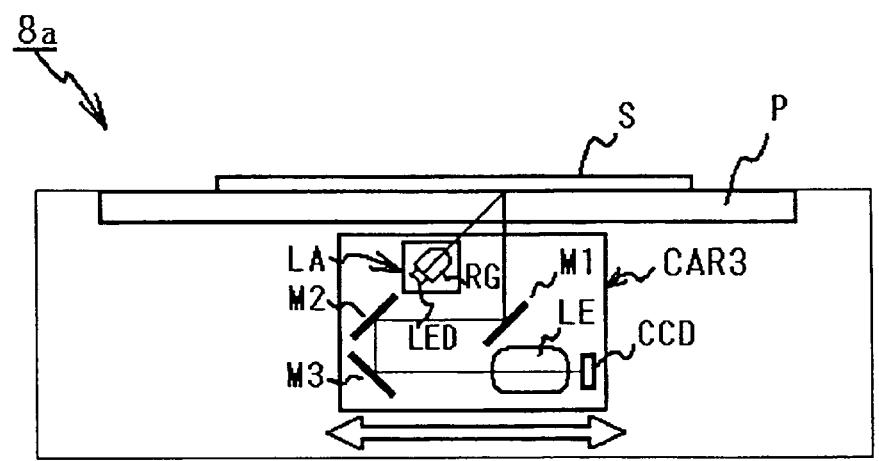
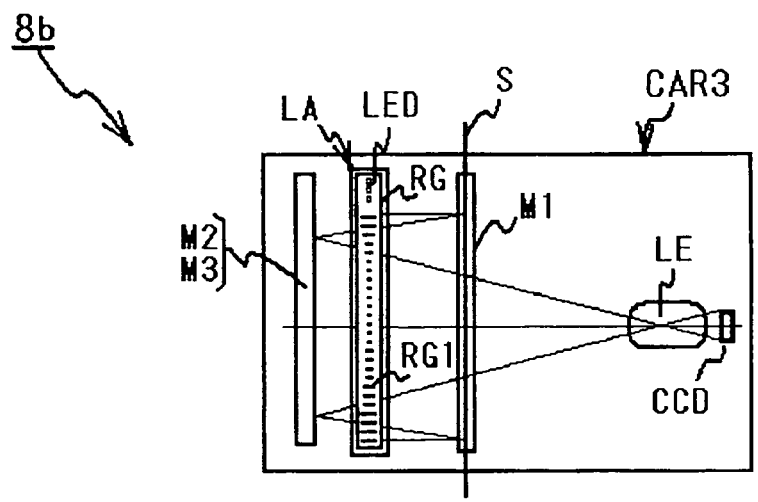

FIG.14
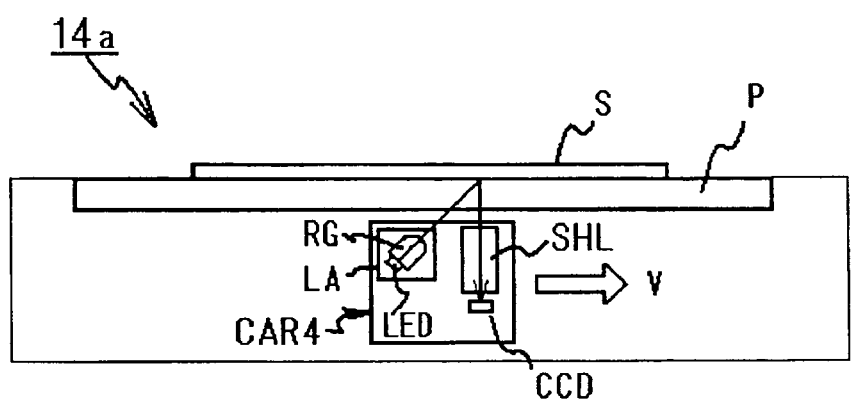
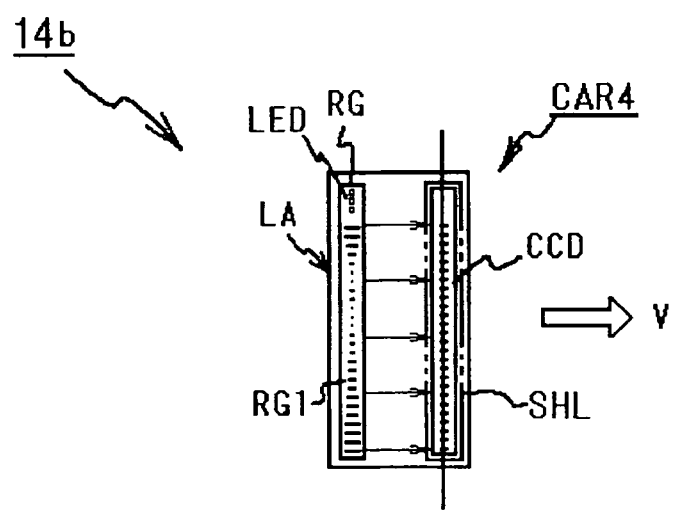

LED LIGHT SOURCE AND IMAGE READING APPARATUS

BACKGROUND OF THE INVENTION

The present invention relates to an LED light source with an LED as a light-emitting source used in an image reading apparatus as a light source, and an optical reduction type image reading apparatus using the LED light source as a light source.

Conventionally, as this kind of optical reduction type image reading apparatus, for example, such an apparatus has been known in Patent Document 1 [Japanese Laid-Open Patent Publication No. 2002-101263]. In FIG. 1, as shown in FIG. 1a, the optical reduction type image reading apparatus is comprised of a platen P for mounting a read original S, a first carriage body having a light source LA for lighting an original surface of the read original S placed on a mount surface of the platen P and a reflector M1 for reflecting the reflected light from the original surface of the read original S, a second carriage body having reflectors M2 and M3 for guiding the reflected light of the reflector M1 to a light-receiving means CCD, and as shown in FIG. 1b, a light-receiving section having an optical lens LE for condensing the reflected light from the reflector M3 of the second carriage body to form an image on a light-receiving surface of the light-receiving means CCD, and the light-receiving means CCD for receiving the image light of the read original S condensed by the optical lens LE.

Then, in this image reading apparatus, as shown in FIG. 1a, it is configured that the first carriage body is moved from a left corner to a right corner of the sheet along the original surface of the read original S at a velocity V, the second carriage body is moved in the same direction at a half velocity of the traveling velocity of the first carriage body while following movement of the first carriage body, and that the light-receiving means CCD reads the original surface of the read original S.

Meanwhile, as a light source LA used as a light-emitting source of the image reading apparatus, for example, an LED light source LA with an LED as a light source is known as described in Patent Document 2 [Japanese Laid-Open Patent Publication No. 2000-048616]. The LED light source LA is shown in FIG. 5. As shown in FIG. 5b, the light source is comprised of an LED that is a light-emitting source, and a light guide RG for guiding the light of the LED. Further, the light guide RG is provided with reflecting surface bodies RG1 protruding inside the light guide to retrieve the light emitted from the LED from the inside to the outside of the light guide so as to irradiate the original surface of the read original. As shown in FIG. 5c, the reflecting surface bodies RG1 are formed of dents in the shape of a V (or in the shape of an arc) at predetermined pitches p on the surface of the light guide RG.

First, the above-mentioned optical reduction type image reading apparatus has the following problem.

In other words, in the optical reduction type image reading apparatus, as shown in FIG. 2, even when the original surface of the read original S is irradiated with illumination light LA-Lv of the light source LA in the uniform light amount range LV1, the light amount of light received in the light-receiving means CCD through the optical lens LE undergoes the effect of cosine fourth law, and the light amounts LV2 and LV3 in the opposite end portions fall as shown in the figure. As a result, the center portion is bright, the opposite sides are dark, and unevenness develops in the light amount of the image as a whole. In addition, the cosine fourth law is that the image surface illuminance by incident light with any angle from the optical axis decreases in proportion to the fourth power of cosine of the incident angle ($\alpha$) in relation to the image surface illuminance by incident light parallel with the optical axis.

Therefore, in the case of above-mentioned Patent Document 1, as shown in FIG. 3, the problem is solved by providing a slit plate SH with a slit aperture SH1 in between the optical lens LE and light-receiving means CCD. The slit aperture SH1 of the slit plate SH is opened so that the clearance is narrow in the center and broader as the clearance is closer to the opposite sides. Thus, as shown in FIG. 4, by reducing the amount of received light as approaching the center portion of the light-receiving CCD to uniform, unevenness in the light amount of the image is resolved.

However, this method of providing the slit plate SH is to reduce the entire light-amount level by cutting the amount of received light of the light-receiving means CCD, the whole of the image to read is darkened, and reading is sometimes made impossible due to a lack of the light amount.

Meanwhile, the following problem arises in the above-mentioned LED light source LA.

In other words, as shown in FIG. 5a, it is known that the LED light source LA provides the light-source characteristic LA-Lv with a phenomenon of peak occurring near the LED by concentration of light.

Therefore, in the case of above-mentioned Patent Document 2, the problem is solved as shown in FIG. 6b. In other words, the light source LED is separated from the light guide RG, an aperture plate Ep is provided in between the LED and RG, the light from the light source LED is thereby reduced, while the surface with the reflecting surface bodies RG1 formed is inclined a slant $\alpha$ so that the diameter of the light guide is narrowed as the distance from the LED increases, and as shown by the solid line in FIG. 6a, the phenomenon of peak is suppressed to almost uniform the light source characteristic LA-Lv.

However, in the method of gradually decreasing the diameter of the light guide so that the surface with the reflecting surface bodies RG1 formed is a slant $\alpha$, there are limitations in the length of the light guide, and it is hard to prepare a light guide RG with a uniform light-source region. Further, when the light guide RG is formed by resin molding, the light guide becomes deformed by distortion, etc. due to flow and ambient temperature by varying the diameter of the light guide, and the deformation tends to be a factor of unevenness in the light amount.

The present invention was conceived under such circumstances, and it is an object of the invention to provide an LED light source which is optimal as a light source of image reading apparatuses, particularly enables unevenness in the light amount caused by the effect of cosine fourth law in the apparatus to be resolved on the light source side when the light source is used in an optical reduction type image reading apparatus, and is excellent in productivity.

BRIEF SUMMARY OF THE INVENTION

To attain the above-mentioned object, the present invention provides an image reading apparatus having a platen for mounting a read original, an LED light source for lighting the read original mounted on the platen, a lens means for condensing reflected light from a main scanning line of the read original lighted by the LED light source, and a light-receiving means for receiving the reflected light from the main scanning line of the read original condensed by the lens means, where the LED light source has an LED that is a light-emitting source, and a light guide for reflecting the light of the LED by an inner surface thereof to diffuse in the shape of the main scanning line, the LED is disposed in an end portion in the main scanning line direction of the light guide, the light guide has an inner surface opposed to a light-emitting surface of the LED forming a curved reflecting surface for reflecting in the main scanning line direction, and the LED is disposed out of a critical angle region at the end in the main scanning line direction of the curved reflecting surface.

More specifically, the curved reflecting surface is formed of an elliptical curved surface, and the end in the main scanning line direction extends to a position equal to the critical angle of the LED light. The LED uses a single chip type of white LED comprised of a blue LED chip and YAG (Yttrium Aluminium Garnet) yellow fluorescent material, two or more white LEDs are arranged along the main scanning line direction, and both disposed out of the critical angle region, and by causing total reflection of the light from each white LED by the light guide, light leaking from the light guide is suppressed. Further, in the light guide, the outside surface including the curved reflecting surface except the lighting region is surrounded with a support frame that is a white reflecting body to suppress light leaking from the light guide.

Further, the LED uses a single chip type of white LED comprised of a blue LED chip and YAG (Yttrium Aluminium Garnet) yellow fluorescent material, and two or more white LEDs are disposed along the main scanning line direction, and arranged in an appropriate positional relationship corresponding to the distribution of the irradiation light amount in the main scanning line direction.

Furthermore, the light guide is provided with a plurality of reflecting surface bodies spaced at predetermined pitches in the main scanning line direction with the bodies surface-opposed to the LED side inside an inner surface reflection optical path of the light guide to reflect light of the LED toward the outside of the light guide along the main scanning line, and a length in the perpendicular direction to the main scanning line direction of each of the reflecting surface bodies is adjusted corresponding to a light amount to reflect.

Still furthermore, the reflecting surface bodies are formed by protruding the surface from the outside of the light guide in cross section in the shape of an inverse V or in cross section in the shape of an arc, and the length of each of the reflecting surface bodies is adjusted to almost uniform the distribution of the light amount in the main scanning line direction which is reflected off a white reference surface and received in the light-receiving means so as to at least enable a light amount which is passed through the condenser lens and reduced according to the cosine fourth law to be compensated by a reflected light amount.

The present invention is also capable of providing a bright LED light source by providing a curved reflecting surface as a reflecting surface for reflecting light of the LED, making an arrangement of the LED so that the LED is disposed out of a critical angle region at the end in the main scanning line direction of the curved reflecting surface, causing total reflection of the light emitted from the LED inside the light guide, and thereby suppressing light leaking from the light guide.

Further, by forming an elliptical curved surface as the curved reflecting surface, it is possible to suppress the height dimension of the light guide as compared with a circular curved surface, and it is possible to provide a relatively thin compact LED light source.

Furthermore, it is possible to provide an LED light source with efficiency and a broad irradiation range by the curvature of the curved reflecting surface and arrangement of the LED, further using two or more LEDs to dispose each LED in the main scanning line direction, and thereby diffusing the irradiation range of each LED along the main scanning line direction. More specifically, by arranging two or more LEDs along the main scanning line direction as an LED light source, and providing an appropriate arrangement of the curved reflecting surface and LEDs corresponding to the distribution of the irradiation light amount in the main scanning line direction, it is possible to at least compensate for a light amount which is passed through the condenser lens and reduced according to the cosine fourth law, adjust the distribution of the light amount in the main scanning line direction which is reflected off a white reference surface and received in the light-receiving means to be almost uniform, and provide an optical LED light source as a light source of an image reading apparatus without unevenness in the light amount.

Still furthermore, by setting a length of the width in the sub-scanning line direction of each reflecting surface formed in the light guide corresponding to the light amount reduced by the condenser lens, each reflecting surface increases or decreases the reflected light in response to the width, the light amount reduced by the cosine fourth law of the condenser lens is compensated, and it is possible to perform image reading without unevenness in the light amount.

Moreover, it is possible to arrange reflecting surfaces at predetermined pitches in the main scanning line direction of a read original, the reflecting surfaces do not mutually cut off optical paths by providing the reflecting surfaces with sufficient pitches, each of the reflecting surfaces is capable of reliably reflecting the light from the LED, and it is thus possible to perform image reading with further eliminated unevenness in the light amount.

Further, when the light guide is formed by resin molding, it is not necessary to vary the diameter of the light guide, the light guide does not become deformed by distortion, etc. due to flow and ambient temperature, and productivity of the LED light source is excellent.

BRIEF DESCRIPTION OF THE SEVERAL VIEWS OF THE DRAWINGS

FIG. 1 contains configuration diagrams showing a schematic configuration of a conventional optical reduction type image reading apparatus, where FIG. 1a is a configuration diagram of the apparatus, and FIG. 1b is a diagram of an optical reduction optical path;

FIG. 3 contains explanatory views to explain a correcting method for correcting the light amount characteristic on the light-receiving side of FIG. 2 using a slit plate, where FIG. 3a is a perspective view to explain an arrangement relationship of the slit plate, and FIG. 3b is a view to explain the slit plate;

FIG. 5a is a characteristic diagram showing an light amount characteristic by the light source, FIG. 5b is a side elevational view showing a configuration of the LED light source, and FIG. 5c is a plan view showing the configuration of the LED light source;

FIG. 6a is a characteristic diagram showing the light amount characteristic by the light source, and FIG. 6b is a side elevational view showing a configuration of the LED light source;

FIG. 7 contains configuration diagrams showing a schematic configuration of a two-carriage optical reduction type image reading apparatus that is Embodiment 1 installed with an LED light source according to the invention, where FIG. 7a is a configuration diagram of the apparatus, and FIG. 7b is a diagram of an optical reduction optical path;

FIG. 8 contains configuration diagrams showing a schematic configuration of an integral-carriage optical reduction type image reading apparatus that is Embodiment 2 installed with an LED light source according to the invention, where FIG. 8a is a configuration diagram of the apparatus, and FIG. 8b is a diagram of an optical reduction optical path;

FIG. 12a is a plan view of the guide, and FIG. 12b is a side elevational view of the guide;

FIG. 14 contains configuration diagrams showing a schematic configuration of a contact image sensor type image reading apparatus according to Embodiment 3 of the invention, where FIG. 14a is a configuration diagram of the apparatus, and FIG. 14b is a schematic view of the contact image sensor as viewed from the read original side;

DETAILED DESCRIPTION OF THE INVENTION

Figure 2:
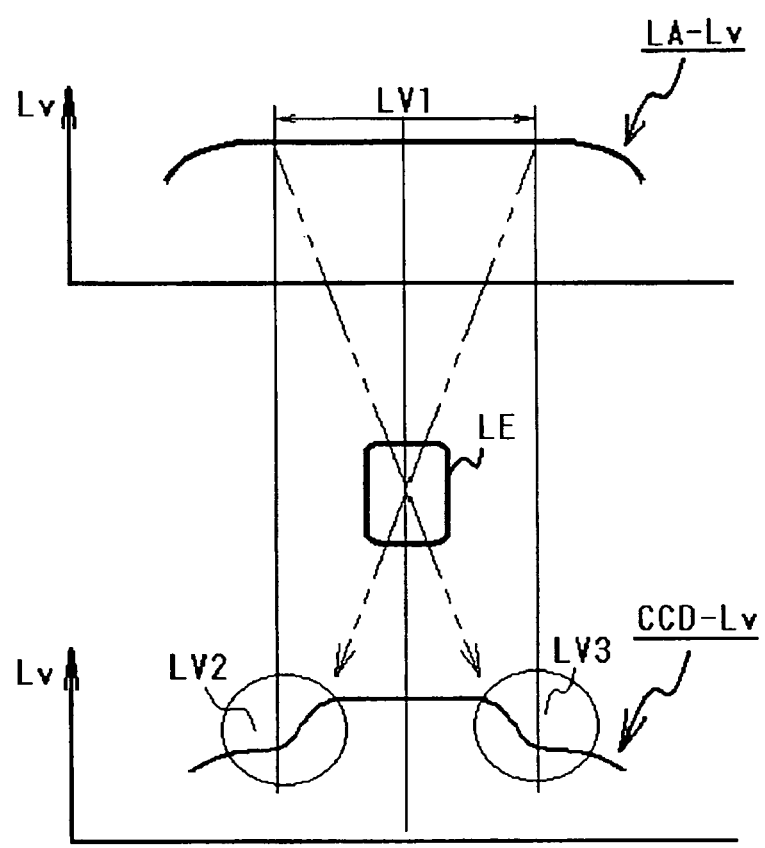
FIG. 2 is a diagram showing light amount characteristics on the light source side and light-receiving side of FIG. 1.
Figure 4:
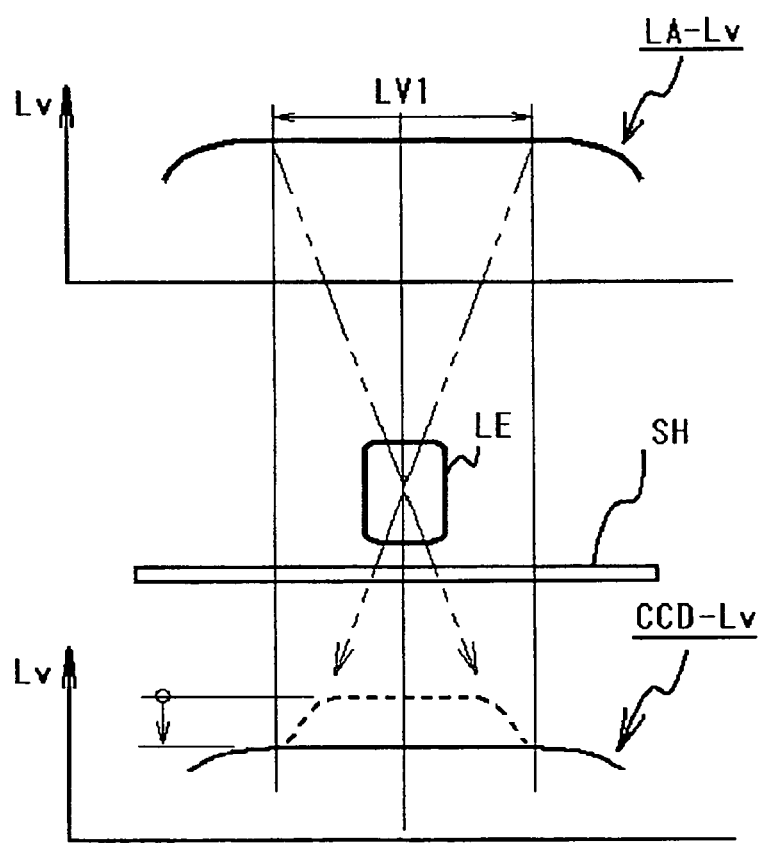
FIG. 4 is a diagram showing light amount characteristics on the light source side and light-receiving side in the case of using the slit plate of FIG. 3.
Figure 5:
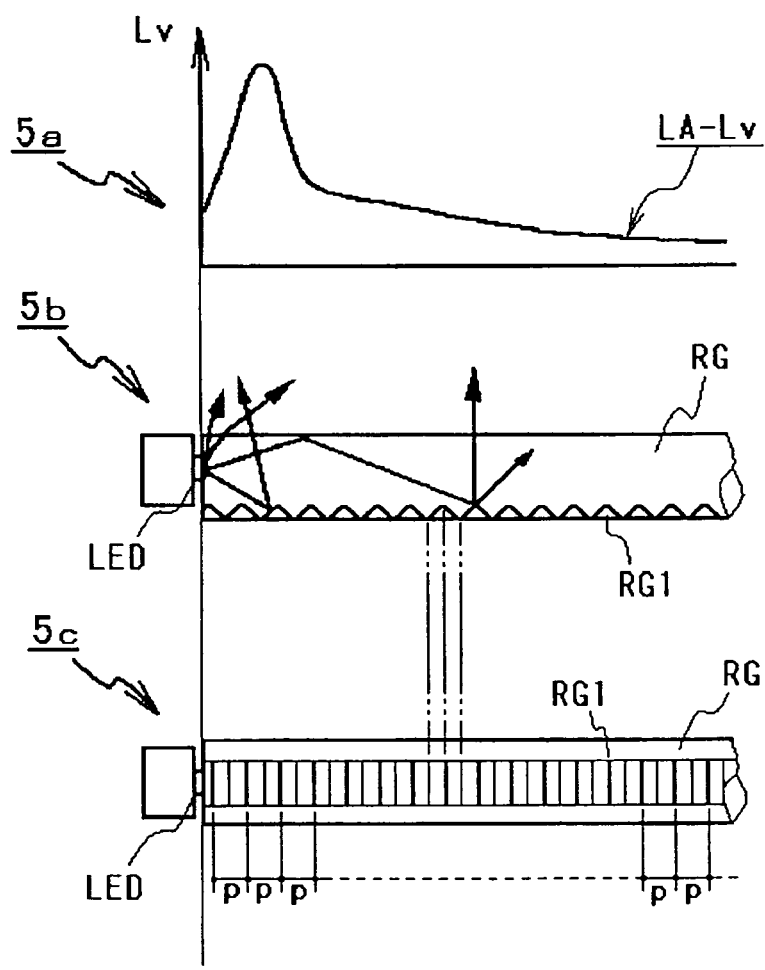
FIG. 5 is to explain a conventional LED light source, where
Figure 6:
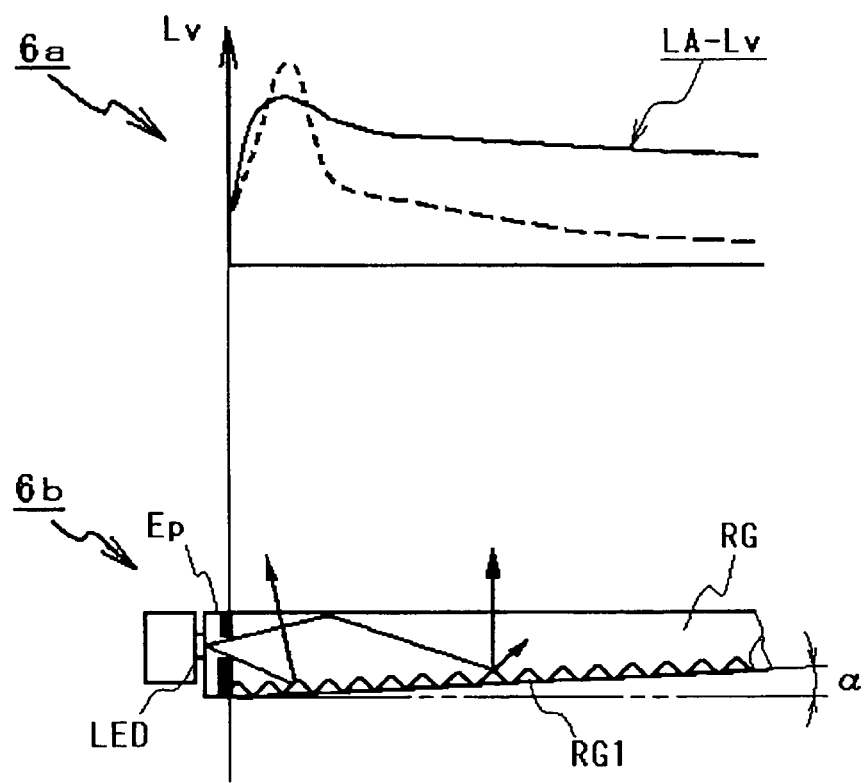
FIG. 6 is to explain a method of improving the light amount characteristic of the conventional LED light source, where

Embodiments will specifically be described below using an LED light source of the invention as a light source of an optical reduction type image reading apparatus.

[Configuration and Operation Outline of the Image Reading Apparatus]

FIG. 7 contains configuration diagrams showing a schematic configuration of a two-carriage optical reduction type image reading apparatus that is Embodiment 1 installed with an LED light source according to the invention, and FIG. 8 contains configuration diagrams showing a schematic configuration of an integral-carriage optical reduction type image reading apparatus that is Embodiment 2 installed with an LED light source according to the invention, where FIGS. 7a and 8a are configuration diagrams of the apparatus, and FIGS. 7b and 8b are diagrams of an optical reduction optical path.

Described first is a two-carriage optical reduction type image reading apparatus that is Embodiment 1 as shown in FIG. 7. In FIG. 7a, the apparatus is comprised of a platen P for mounting a read original S, a first carriage body CAR 1 having an LED light source LA for lighting an original surface of the read original S placed on a mount surface of the platen P and a reflector M1 for reflecting the reflected light from the original surface of the read original S, a second carriage body CAR 2 having reflectors M2 and M3 for guiding the reflected light of the reflector M1 to a light-receiving means CCD, and as shown in FIG. 7b, a light-receiving section having an optical lens LE for condensing the reflected light from the reflector M3 of the second carriage to form an image on a light-receiving surface of the light-receiving means CCD, and the light-receiving means CCD for receiving the image light of the read original S condensed by the optical lens LE.

Then, in this image reading apparatus, as shown in FIG. 7a, it is configured that the first carriage body CAR 1 is moved from a left corner to a right corner of the sheet along the original surface of the read original S at a velocity V, the second carriage body CAR 2 is moved in the same direction at a half velocity of the traveling velocity of the first carriage body CAR 1 while following movement of the first carriage body CAR 1, and that the light-receiving means CCD reads the original surface of the read original S.

Described next is an integral-carriage optical reduction type image reading apparatus that is Embodiment 2 as shown in FIG. 8. In FIG. 8a, the apparatus is comprised of a platen P for mounting a read original S, and a carriage body CAR 3 with a single moving frame body into which are incorporated an LED light source LA for lighting an original surface of the read original S placed on amount surface of the platen P, a reflector M1 for reflecting the reflected light from the original surface of the read original S, reflectors M2 and M3 for guiding the reflected light of the reflector M1 to a light-receiving means CCD, and as shown in FIG. 8b, a light-receiving section having an optical lens LE for condensing the reflected light from the reflector M3 to form an image on a light-receiving surface of the light-receiving means CCD, and the light-receiving means CCD for receiving the image light of the read original S condensed by the optical lens LE.

Then, in this image reading apparatus, as shown in FIG. 8a, it is configured that the carriage body CAR 3 is moved from a left corner to a right corner of the sheet along the original surface of the read original S at a constant velocity, and that the light-receiving means CCD reads the original surface of the read original S.

[Configuration of the LED Light Source LA]

Figure 9:
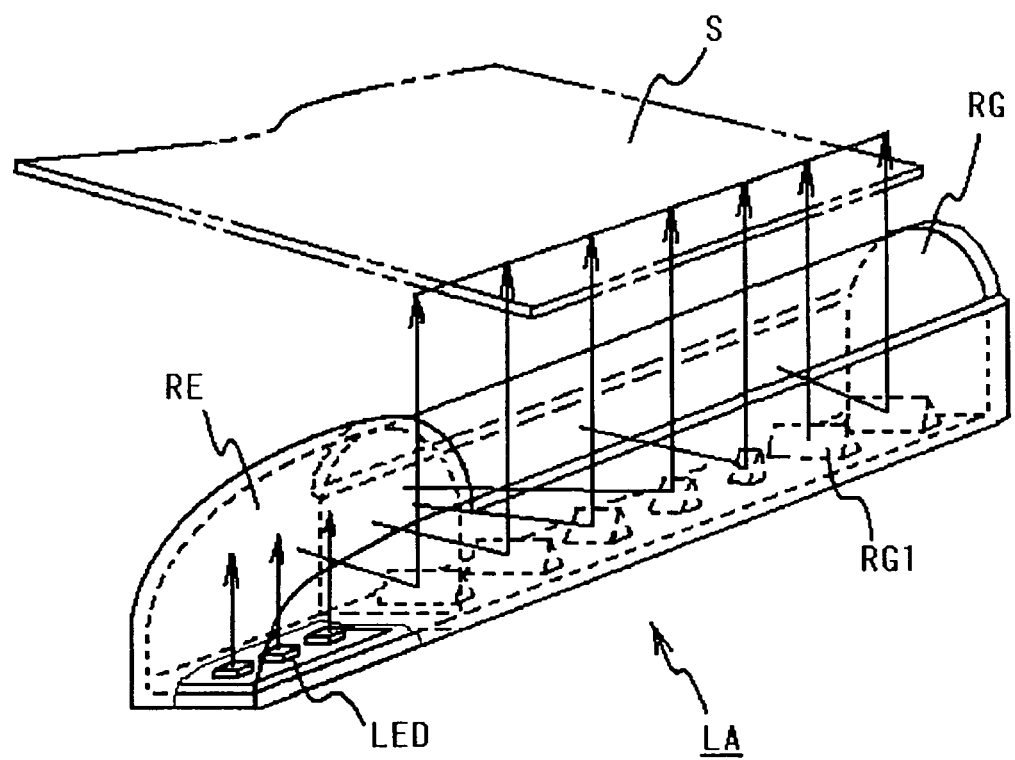
FIG. 9 is an exploded perspective view showing a configuration of the LED light source according to the invention.
Figure 10:
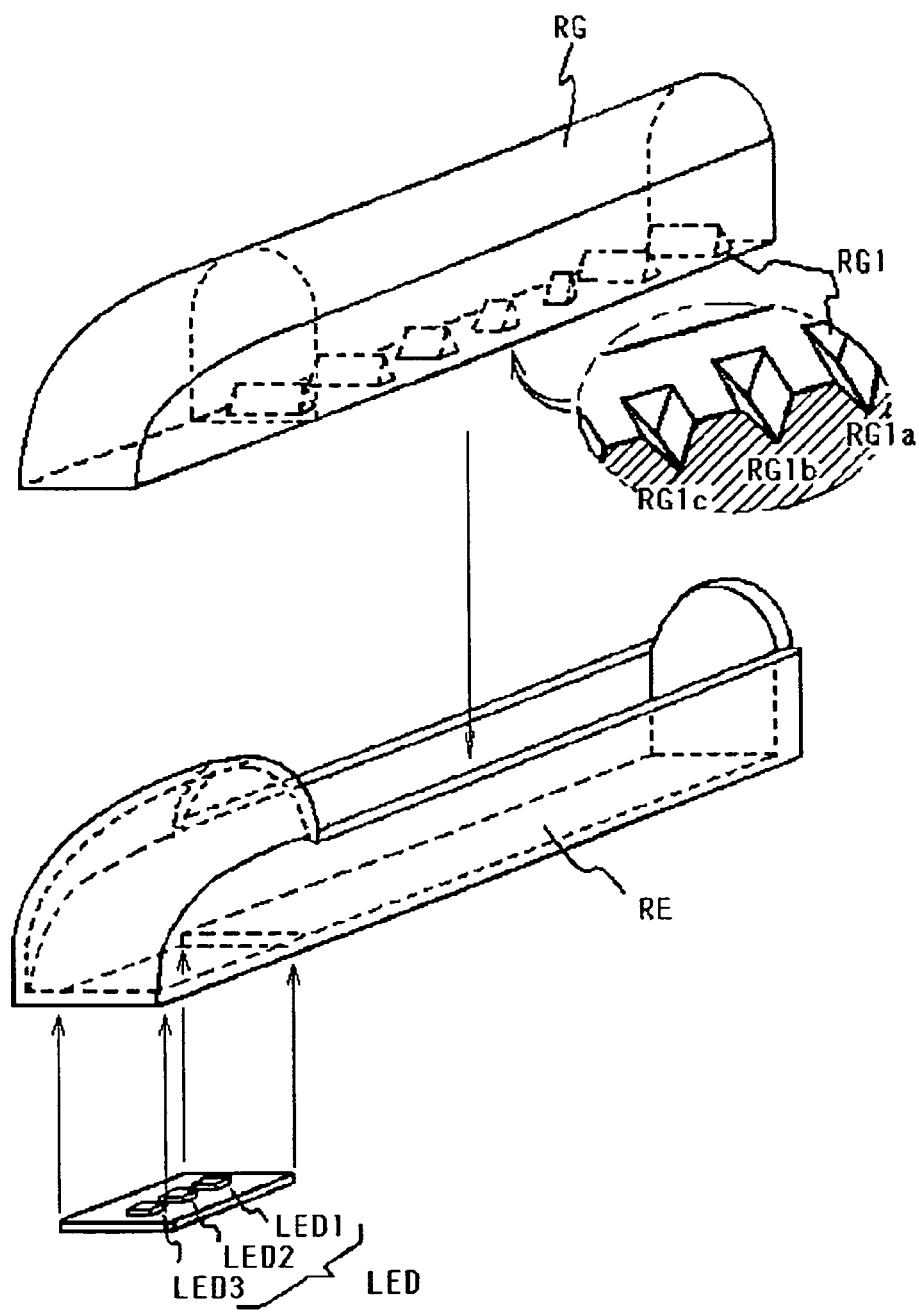
FIG. 10 is an exploded fragmentary perspective view showing the configuration of the LED light source according to the invention.

The configuration of the LED light source according to the invention will specifically be described below based on FIGS. 9 and 10. FIG. 9 is a perspective view showing a schematic configuration of the LED light source, and FIG. 10 is an exploded perspective view of the LED light source.

The LED light source LA is comprised of a light guide RG, a support frame RE for supporting the light guide RG, and LEDs as a light-emitting source secured to the support frame RE to light the read original S via the light guide RG.

[Explanation of the Light Source LED]

The LED used as a light source is a white LED. The white LED is a single chip type, and is a light source configured to emit white light by electric energy using an InGaN blue LED and YAG (Yttrium Aluminium Garnet) yellow fluorescent material. Three white LEDs are arranged at appropriate pitches along the main scanning direction of a read original S. In addition, the number of white LEDs is increased or decreased as appropriate corresponding to the length of the light guide and the light amount characteristic of illumination light.

[Explanation of the Support Frame RE]

The support frame RE is formed by mixing a white pigment into an ABS [Acrylonitrile Butadiene Styrene] resin to be able to support the light guide RG, and is a frame in which at least an inner surface for supporting the light guide RG is opaque white. The reason why the inner surface is opaque white is to reflect light deviating from the critical angle and leaking to the outside from the light guide RG, return the leaking light to the inside of the light guide RG, and thereby increase reflection efficiency of the light guide RG. Particularly, an end Q1 in the main scanning line direction of the support frame RE covering a curved reflecting surface RG0 of the light guide RG described later is formed to reach at least a position of the critical angle enabling the light emitted from the LEDs to be totally reflected in the main scanning line direction of the light guide RG.

[Explanation of the Light Guide RG]

The light guide RG is generally obtained by forming a material with high transparency such as, for example, an acrylic resin known as acrylic glass that is a transparent solid material made of a polymethyl methacrylate resin PMMA and a polycarbonate resin that is one kind of thermoplastic resins. In addition, the refractive index of acrylic resin is 1.49, the critical angle (angle at which total reflection starts to occur) thereof is about 42 degrees, the refractive index of polycarbonate resin is 1.585, and the critical angle thereof is about 39 degrees.

Herein, the light guide RG is formed using an acrylic resin, and shown as an enlarged view in FIG. 10, is comprised of a concave groove with a lower surface cut in V-shape from the outside to the inside of the resin. A plurality of reflecting surface bodies RG1 is formed at predetermined pitches P. The bodies RG1 form reflecting surfaces for reflecting the light passed through the resin in the direction for lighting the read original S, and the entire original width of the read original S is lighted along the main scanning direction of the read original S.

Figure 11:
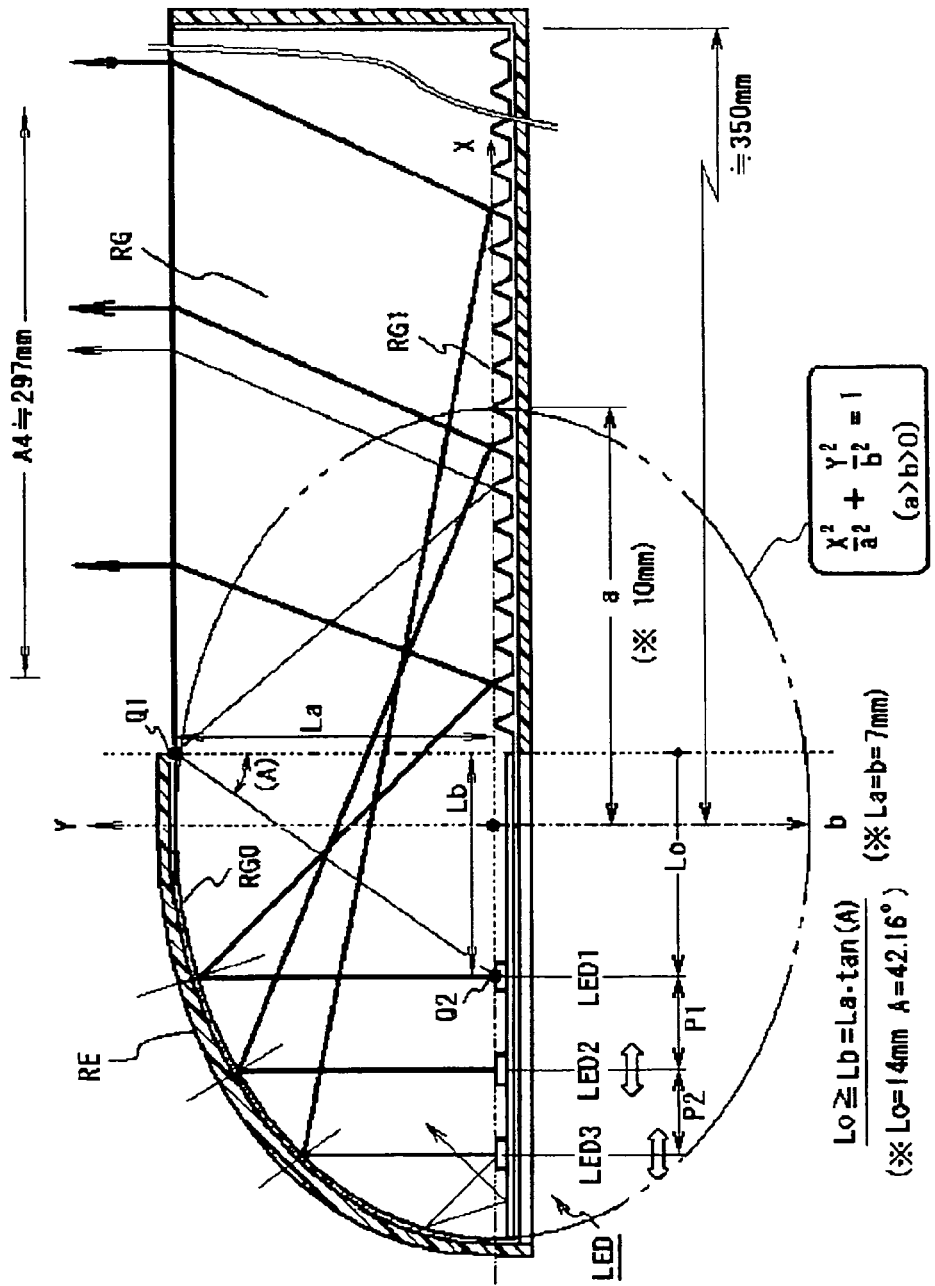
FIG. 11 is a sectional side elevational view showing the configuration of the LED light source according to the invention.

The light guide RG will be further described specifically with reference to FIG. 11. FIG. 11 shows a section almost at the center along the main scanning direction, and particularly, the reflecting surface above the LEDs forms a curved reflecting surface RG0 along the locus drawn by the following equation:

$$X^2/a^2 + Y^2/b^2 = 1 \ldots \text{Ellipse}$$

where a>b>0.

Formed actually was an elliptical curved reflecting surface RG0 where a design value of the major axis a was 10 mm, and a design value of the minor axis b was 7 mm. By reflecting light by the curved reflecting surface RG0, as shown in FIG. 11, it is configured that the light emitted from the LED 1 reaches a front point by being first reflected off the reflecting surface body RG1, the light emitted from the LED 2 reaches an almost center point by being first reflected off the reflecting surface body RG1, and that the light emitted from the LED 3 reaches a far point by being first reflected off the reflecting surface body RG1. In addition, not required in this Embodiment, by cutting the front end portion of the curved reflecting surface RG0 perpendicularly corresponding to reflection efficiency, forming conditions or the like, and thereby forming a perpendicular reflecting surface together with the support frame, it is possible to reflect the light from the LED further in the read main scanning direction, and corresponding to the reflection, the illuminance of the LED light source LA is increased. Further, it is also possible to reduce dimensions of the LED light source LA and make the entire apparatus compact.

[Shape Arrangement of Reflecting Surface Bodies RG1]

Figure 12:
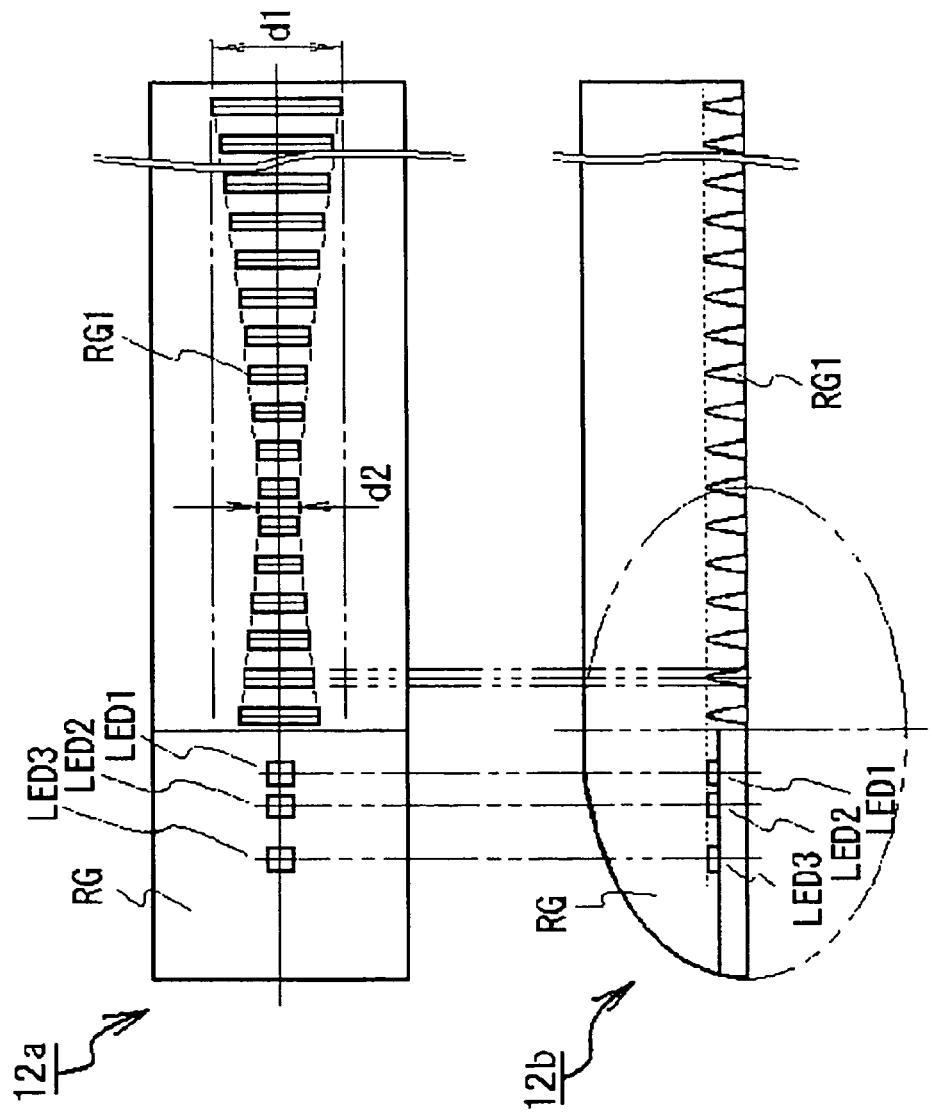
FIG. 12 contains explanatory views showing a configuration of a light guide of the LED light source according to the invention, where

The reflecting surface bodies RG1 for reflecting the light from the LED to irradiate the read original in the read main scanning direction in line form are arranged at almost equal pitches as shown in the side elevational view of FIG. 12b, and are formed of the surface protruded in cross section in the shape of an inverse V or in cross section in the shape of an arc from the outside of the light guide. Further, as shown in the plan view of FIG. 12a, the widths are formed such that the width in the center portion is width d2 and, narrow and that the width on the furthermost side is width d1 and wide. Each width d of the reflecting surface body RG1 is determined to enable the reflected light amount to increase or decrease so as to compensate for attenuation of the light due to the abovementioned cosine fourth law so that the received light amount is almost uniform within the read main scanning region when the light-receiving means CCD described later in FIG. 13 reads a white reference. In addition, specifically, the width d2 is about 2 mm, and the width d1 is about 5 mm.

[Arrangement of LEDs]

As an arrangement of LEDs, the positions can be determined by conditions [in this case, a value of the major axis a and a value of the minor axis b in the elliptical curved surface] of the curved reflecting surface RG0 and critical angles specific to the light guide RG being set. When the positions of the LEDs are determined, determined is the end Q1 in the main scanning line direction of the curved reflecting surface RG0 opposed to the emitting surfaces of the LEDs, and set is a reflecting surface shape of the support frame surrounding the curved reflecting surface RG0. Accordingly, for an arrangement of LEDs, the arrangement can be adjusted as appropriate at least out of the critical angle region of the end Q1 in the main scanning line direction of the curved reflecting surface RG0 surrounded by the reflecting surface of the support frame. Actually, in the case of a three-chip LED configuration, each LED is adjusted and disposed as appropriate out of the critical angle region of the end Q1 in the main scanning line direction of the curved reflecting surface RG0.

Figure 13:
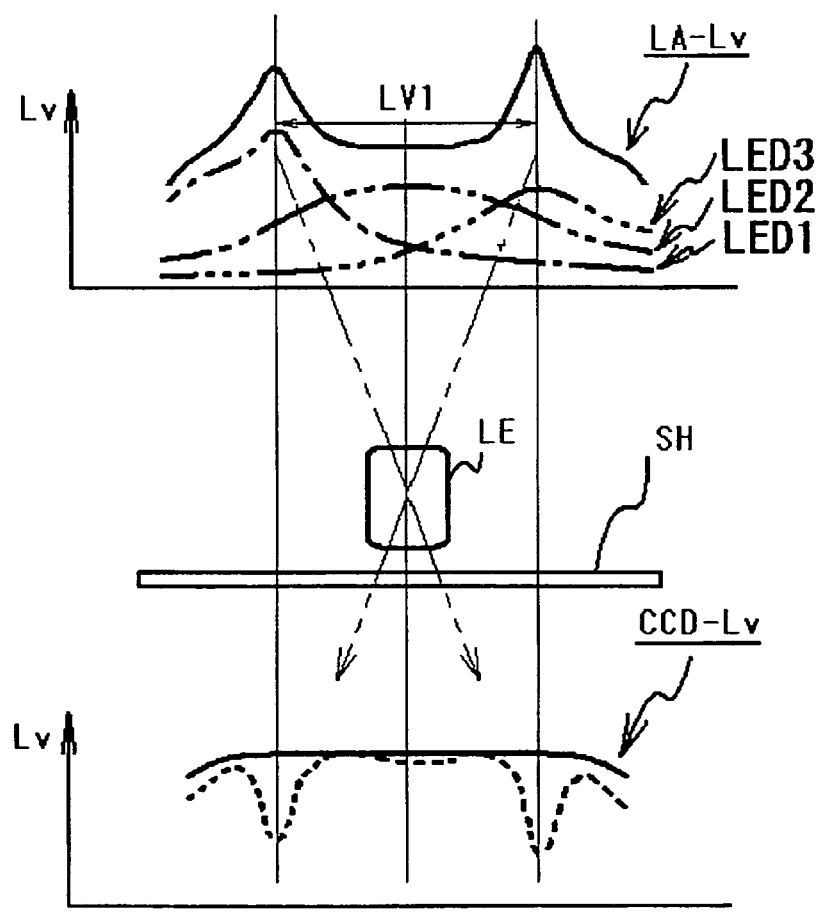
FIG. 13 is a diagram showing light amount characteristics on the light source side and light-receiving side of the LED light source according to the invention.

More specifically, for the arrangement of LEDs, arrangement positions (pitches P1, P2) of the LED 2 and LED 3 are adjusted as appropriate in the read main scanning direction with reference to the distribution of light amount of the LED 1 which illuminates the nearest with the reflected light amount of a high level, and as an LED light source, it is configured to form the distribution of light amount so as to compensate for above-mentioned attenuation of the light due to the cosine fourth law of the condenser lens LE as shown in FIG. 13. In addition, as shown in FIG. 11 specifically, a dimension L0 shown in the figure from the end Q1 in the main scanning line direction of the curved reflecting surface RG0 above the LED 1 undergoes position adjustments corresponding to the distribution of light amount with reference to a distance of 6.3 mm of a retreat distance Lb defined by the line Q1-Q2 to set the critical angle (A) at about 42 degrees. Further, the pitch between the LED 1 and LED 2 and the pitch between the LED 2 and LED 3 are both determined to be 2 mm as a reference value when the minimum width of the read original S is set at about 297 mm, and about 350 mm is as the entire length in the main scanning line direction of the light guide RG from the center of the ellipse of the light guide RG, and with reference to the reference value, each pitch is adjusted and set corresponding to the distribution of light amount.

[Distribution of Light Amount of the LED Light Source]

Described next is the distribution of light amount of the LED light source. As shown in FIG. 13, when the light-receiving means CCD reads a white reference, the light attenuates due to the cosine fourth law of the condenser lens LE as shown by the dotted line. Therefore, in order for the light amount CCD-Lv to be shown by the solid line such that the amount of received light is almost uniform within the read main scanning region LV1, with reference to the distribution of light amount of the LED 3 as shown by the alternate long and three-short dashed lines, positioning of each of the LEDs 1, 2 and 3 is adjusted so as to obtain the distribution of light amount of LED 1 as shown by the alternate long and one-short dashed lines, and the distribution of light amount of LED 2 as shown by the alternate long and two-short dashed lines. As a result, as shown in the figure, the distribution of light amount LA-Lv of the LED light source is provided with illumination characteristics for reinforcing the light amount of the light attenuated by the cosine fourth law.

[Embodiment 2]

Figure 15:
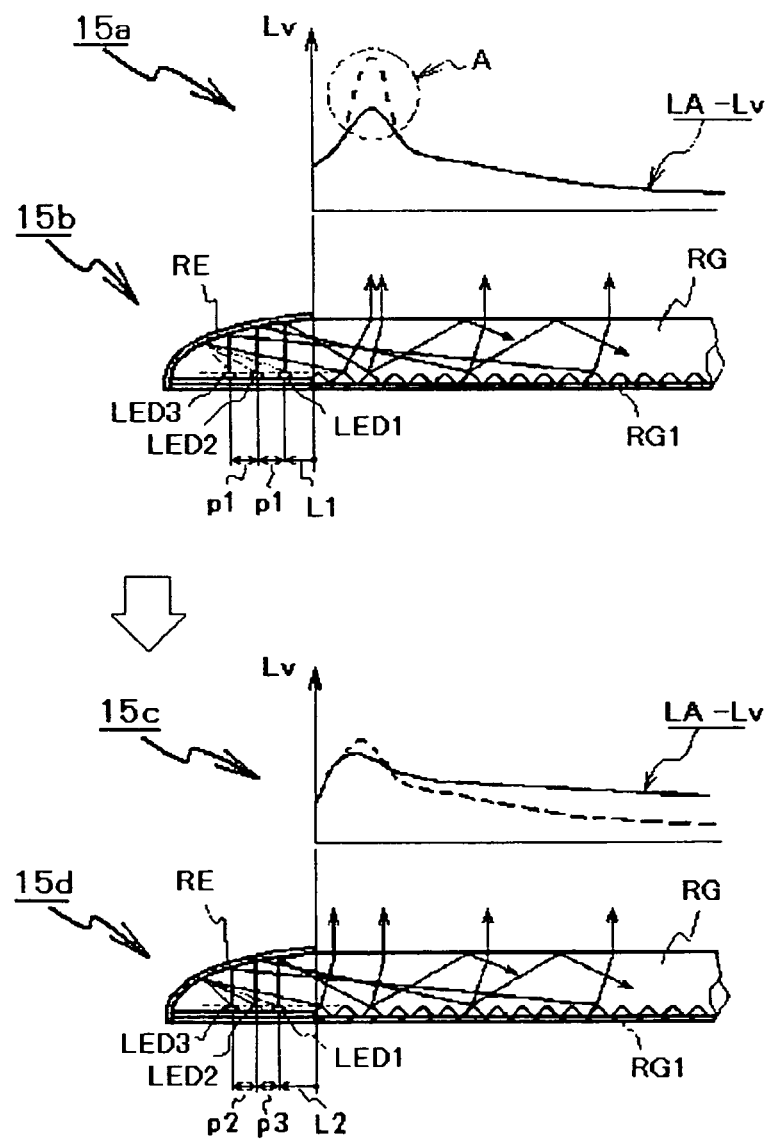
FIG. 15 is a diagram showing light amount characteristics on the light source side and light-receiving side of the LED light source according to Embodiment 3.

Embodiment 2 will be described below based on FIGS. 14 and 15. In Embodiment 2, the LED light source of the invention described previously is used as a light source of a contact image sensor type image reading apparatus.

[Configuration and Operation Outline of the Image Reading Apparatus]

FIG. 14 contains configuration diagrams showing a schematic configuration of a contact image sensor type image reading apparatus according to the invention, where FIG. 14a is a configuration diagram of the apparatus, and FIG. 14b is a schematic view of the contact image sensor as viewed from the read original side.

The entire apparatus configuration will be described first based on FIG. 14a. The apparatus is comprised of a platen P for mounting a read original S, and a carriage body having an LED light source LA for lighting an original surface of the read original S placed on a mount surface of the platen P, a Selfoc lens SL for condensing the reflected light from an original surface of the read original S, and a light-receiving means CCD for receiving the condensed image light of the read original S from the Selfoc lens SHL.

Then, as shown in FIG. 14a, this image reading apparatus is configured to move the carriage body from a left corner to a right corner of the sheet along the original surface of the read original S at a velocity V, and to read the original surface of the read original using the light-receiving means CCD.

[Distribution of Light Amount of the LED Light Source]

Described next is the distribution of light amount of the LED light source applied to Embodiment 2 based on FIG. 15. FIG. 15a shows the distribution of light amount of the LED light source manufactured based on the invention. Further, FIG. 15b shows the LED light source, where the reflecting surface above three LEDs is formed in the shape (elliptical shape) of the curved reflecting surface RG0 as described previously.

Therefore, as compared with the distribution of light amount (dotted lines) of the conventional LED light source described previously as shown by A in the figure, the light amount in the LED end portion of the light guide RG is attenuated, and unevenness in the light amount is dissolved in the main scanning line direction.

Next, FIG. 15c shows the distribution of light amount of an LED light source, where the arrangement relationship of LEDs is further adjusted in relation to the LED light source as described above. FIG. 15d shows a configuration of this LED light source.

The difference between FIG. 15b and FIG. 15d will be described below. In FIG. 15b, the curvature forming the curved reflecting surface RG0 of the light guide RG is determined to be the elliptical shape of $[X^2/a^2+Y^2/b^2=1]$ with the major axis=10 mm and the minor axis b=7 mm as shown in FIG. 11 described previously, a position L1 of the LED 1 on the front side in the main scanning line direction is thereby set at distance L0=6.3 mm in the critical angle region described previously, and when the minimum width of the read original S is set at 297 mm and the entire length from the center of the ellipse of the light guide RG is 350 mm in the main scanning line direction of the light guide RG, each of pitches between the LED 1 and LED 2 and between the LED 2 and LED 3 is set at p1=2 mm. In contrast thereto, in FIG. 15d, a pitch p2 between the LED 1 and LED 2 and a pitch p3 between the LED 2 and LED 3 are adjusted corresponding to the distribution of light amount with reference to a reference value of 2 mm.

As a result, as shown in FIG. 15c, the light amount of the LED end portion of the light guide RG is further attenuated, and it is possible to resolve evenness in the light amount in the main scanning line direction.

As described above, by making adjustments to the distribution of light amount of the LED light source in accordance with a usage pattern, it is possible to use the LED light source as a light source of an optical reduction type image reading apparatus and a light source of a contact image sensor type image reading apparatus.

[Other Embodiments]

In the above-mentioned Embodiments, in order to form the light-amount distribution LA-Lv of the LED light source so as to compensate for attenuation of the light due to the cosine fourth law of the condenser lens LE, the width of each reflecting surface body RG1 is first changed, and adjustments are second made to the retreat position Lb defined from the critical angle (A) of the LED 1 and to pitches P1 and P2 among the LED 1, LED 2 and LED 3 as appropriate. However, when adjustments can be made using only the width of each reflecting surface body RG1, only widths of the reflecting surface bodies RG1 may be adjusted. Meanwhile, adjustments can be made using only the arrangement relationship among the LED 1, LED2 and LED 3, only positioning of each LED may be adjusted.

Further, the reflecting surface of the reflecting surface body RG1 is not limited to the shape of a V-cut, and may be the shape of a semicircular-cut, for example.

Furthermore, the end-portion curved surface of the light guide is most preferably of an ellipse, but may be a spherical surface other then the ellipse. In addition, when the curved surface is of an ellipse, as compared with a spherical surface, it is possible to control the height of the light guide to be low, and the entire apparatus is made compact and excellent in size reduction.

Still furthermore, by providing the surface of a substrate to which the LED light source is secured with silk-screen white, it is possible to enhance reflection efficiency of the LED light source, and provide a brighter LED light source corresponding to the enhanced efficiency.

Moreover, in each of the above-mentioned Embodiments is disclosed the LED light source where LEDs are disposed on one side of the light guide RG, but it is naturally possible to provide a bright LED light source best suited to image reading apparatuses by disposing the LED light sources at opposite ends of the light guide RG, and adjusting the shape (elliptical constants a, b) of the curved reflecting surface RG0, the retreat position of the LED from the critical angle region, widths of the reflecting surface bodies, etc. corresponding to the required amount of illumination light.

Further, when adjustments are not made sufficiently to the shape of the curved reflecting surface RG0, LED arrangement, etc. corresponding to the required amount of illumination light due to specifications of the apparatus, and particularly, two or more LEDs are used, a PWM circuit is formed in the lighting control means for lighting each LED to control the lighting time of each LED, and the adjustments can thereby be made.

Figure 16:
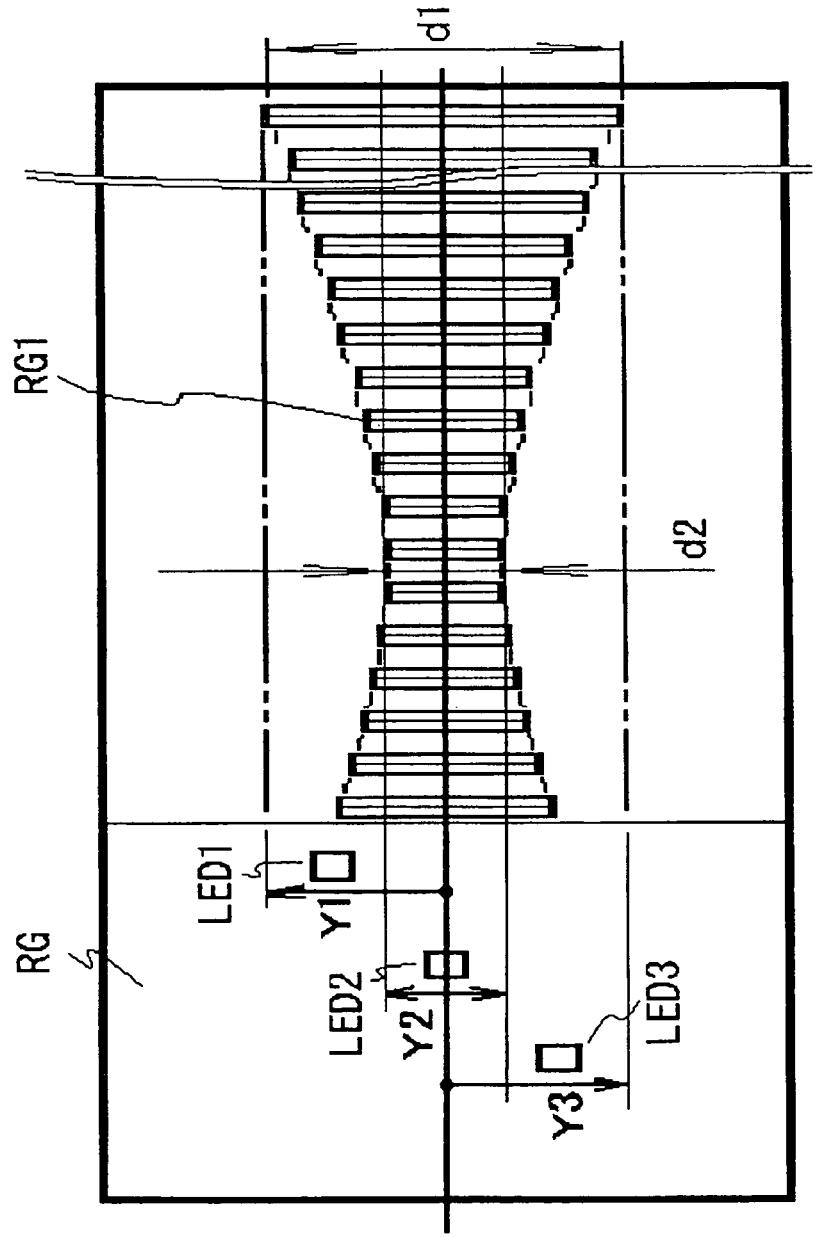
FIG. 16 is an explanatory view showing another LED arrangement configuration according to the invention.

Still furthermore, when the arrangement of LEDs is adjusted corresponding to the required amount of illumination light, adjustments can be made by shifting the position of each LED in the direction perpendicular to the main scanning line direction as shown in FIG. 16.

What is claimed:

1. An LED light source device installed in an image reading apparatus, comprising:
   an LED that is a light-emitting source; and
   a light guide for reflecting light of the LED by an inner surface thereof to diffuse along a main scanning line direction and irradiating the light reflected by the light guide to a surface of a sheet,
   wherein the light guide has a plurality of reflecting surface bodies spaced at predetermined pitches in the main scanning line direction inside an inner surface reflection optical path of the light guide to reflect the light from the LED toward an outside of the light guide along the main scanning line direction,
   the plurality of reflecting surface bodies includes a first reflecting surface body present at one end side in the main scanning line direction and a second reflecting surface body present at a center part the main scanning line direction, and
   a length in a perpendicular direction to the main scanning line direction of the second reflecting surface body is different from that of the first reflecting surface body.

2. The LED light source device according to claim 1, wherein the plurality of reflecting surface bodies has a shape of an inverse V or a shape of an arc in a cross section thereof relative to a bottom surface of the light guide, and
   the length in the perpendicular direction to the main scanning line direction of the second reflecting surface body present at the center part in the main scanning line direction is shorter than the length in the perpendicular direction to the main scanning line direction of the first reflecting surface body present at the one end side in the main scanning line direction.

3. The LED light source device according to claim 2, wherein the LED comprises a plurality of LED members arranged along the main scanning line direction at the other end side of the light guide,
   the plurality of reflecting surface bodies further includes a third reflecting surface body present at a position adjacent to the LED, and
   the length in the perpendicular direction to the main scanning line direction of the third reflecting surface body is greater than that of the second reflecting surface body.

4. The LED light source device according to claim 3, wherein the light guide further includes a reflecting surface reflecting the light from the LED to the plurality of reflecting surface bodies, and the plurality of reflecting surface bodies reflects the light from the reflecting surface to the surface of the sheet such that a distribution of the light reflected from the plurality of reflecting surface bodies in the main scanning line direction is substantially uniform on the surface of the sheet.

5. The LED light source device according to claim 4, wherein the reflecting surface is a curved reflecting surface, and the plurality of reflecting surface bodies is arranged at different pitches in the main scanning direction.

6. The LED light source device according to claim 5, wherein the light guide further includes an emitting surface for emitting the light toward the surface of the sheet outside the light guide, and the emitting surface is arranged at one side facing the plurality of reflecting surface bodies.

7. The LED light source device according to claim 1, wherein the LED comprises a plurality of LED members,
   the plurality of LED members is arranged along the main scanning line direction at the other end side of the light guide, and
   the light guide further has a curved reflecting surface reflecting the light from the LED to the plurality of reflecting surface bodies.

8. The LED light source device according to claim 1, further comprising a light-receiving part receiving the light reflected from the sheet,
   wherein a length of each of the plurality of reflecting surface bodies is formed in a length for substantially uniforming a distribution of a light amount in the main scanning direction that is reflected from a white reference surface and that is received in the light-receiving part.

9. An image reading apparatus, comprising:
   a platen for mounting a sheet;
   an LED that is a lighting source for lighting the sheet mounted on the platen;
   a light guide for reflecting light of the LED by an inner surface thereof to diffuse along a main scanning line direction and irradiating the light reflected by the light guide to a surface of the sheet;
   a lens for condensing reflected light from the surface of the sheet; and
   a light-receiving part for receiving the reflected light from the sheet condensed by the lens,
   wherein the LED is disposed in an end portion in the main scanning line direction of the light guide,
   the light guide has a first reflecting surface reflecting the light from the LED in the main scanning line direction and a second reflecting surface reflecting the light reflected from the first reflecting surface to the surface of the sheet outside the light guide, and
   the LED comprises a plurality of LED members arranged along the main scanning line direction such that a distribution of a light amount in the main scanning line direction is substantially uniform.

10. The image reading apparatus according to claim 9, wherein a number of the plurality of LED members is three or more, and the plurality of LED members is arranged at different pitches in the main scanning direction.

11. The image reading apparatus according to claim 9, wherein the second reflecting surface includes a plurality of reflecting surface bodies having two first reflecting surface bodies and a second reflecting surface body,
   the first reflecting surface bodies are arranged at two ends of the plurality of reflecting surface bodies and the second reflecting surface body is arranged at a center part of the plurality of reflecting surface bodies, and
   a length in a perpendicular direction to the main scanning line direction of the second reflecting surface body is shorter than that of the first reflecting surface body.

12. The image reading apparatus according to claim 9, wherein the first reflecting surface is a curved reflecting surface.

13. An LED light source device installed in an image reading apparatus, comprising:
   an LED that is a light-emitting source; and
   a light guide for reflecting light of the LED by an inner surface thereof to diffuse along a main scanning line direction and irradiating the light reflected by the light guide to a surface of a sheet,
   wherein the light guide has a reflecting portion in an inner surface reflection optical path of the light guide to reflect the light from the LED toward an outside of the light guide along the main scanning line direction,
   the reflecting portion includes a first reflecting portion present at one end side in the main scanning line direction and a second reflecting portion present at a center part in the main scanning line direction, and lengths in a perpendicular direction to the main scanning line direction of the first portion and second reflecting portion are different from each other.

14. The LED light source device according to claim 13, wherein the length in the perpendicular direction to the main scanning line direction of the second reflecting portion is shorter than that of the first reflecting portion.

15. The LED light source device according to claim 13, wherein the light guide further includes an emitting surface for emitting the light toward the surface of the sheet outside the light guide, and the reflecting portion is arranged on one side of the light guide facing the emitting surface.

16. The LED light source device according to claim 13, wherein the LED is arranged on the other end side of the light guide opposite to the first reflecting portion, and the length in the perpendicular direction to the main scanning line direction of the second reflecting portion present at the center part in the main scanning line direction is shorter than the length in the perpendicular direction to the main scanning line direction of the first reflecting portion present at the one end side in the main scanning line direction.

* * * * *